Feb. 3, 1942.  A. C. MOORK  2,271,923
HOOK
Filed Dec. 13, 1940
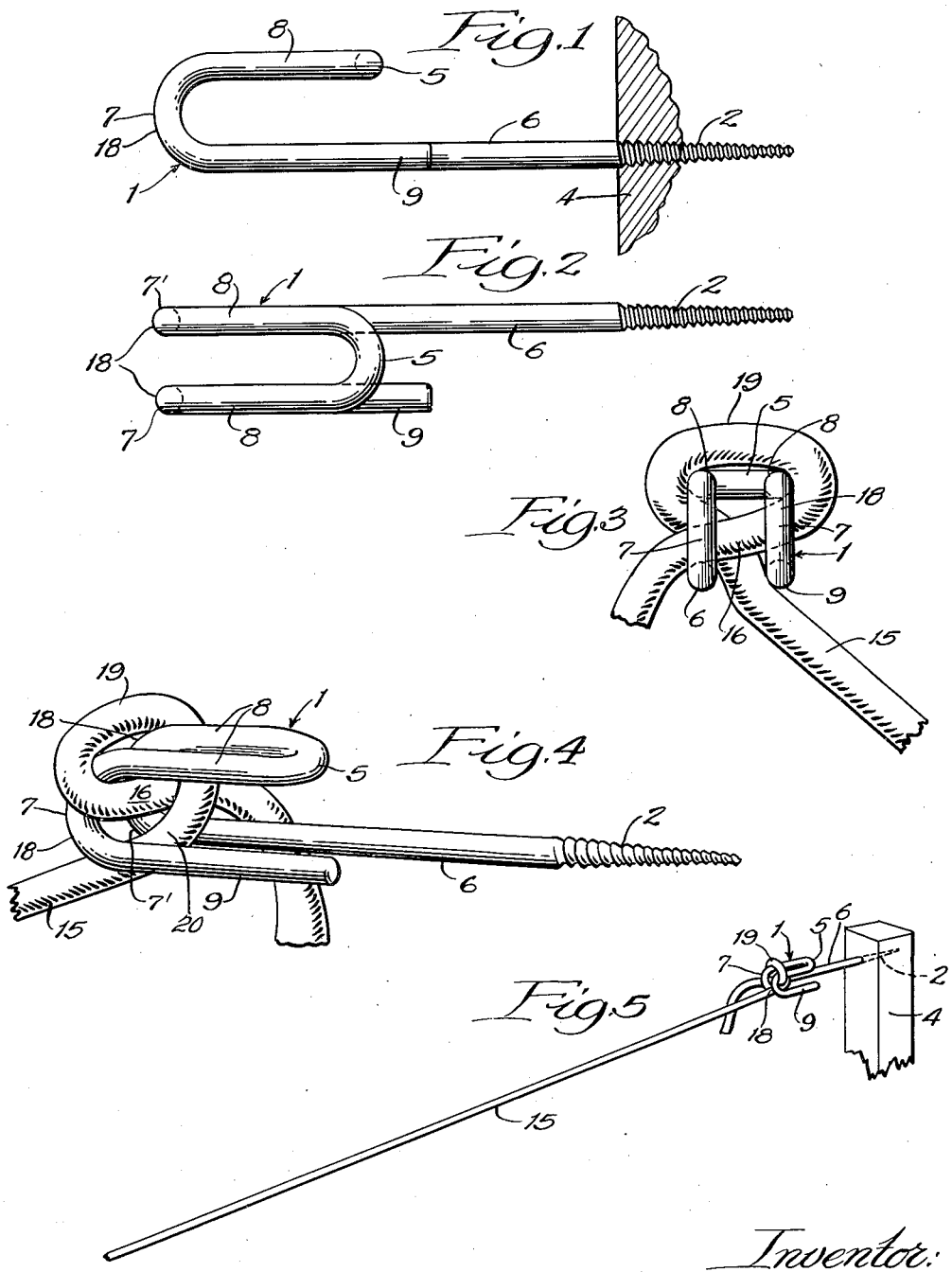
Inventor:
Alfred C. Moork,
By Rummler Rummler & Davis
Attorneys.
Witnesses:

Patented Feb. 3, 1942

2,271,923

UNITED STATES PATENT OFFICE 2,271,923

HOOK

Alfred C. Moork, Chicago, Ill., assignor of one-third to George Corbet and one-third to Ralph H. Corbet, both of Chicago, Ill.

Application December 13, 1940, Serial No. 370,020

7 Claims. (Cl. 24—131)

My invention relates to hooks of various sizes for anchoring the ends of clotheslines, strings, cords, towlines, hawsers and the like; and the main objects are to provide a hook of this kind which shall be of simplified and more efficient design and shall be adapted for ready manual attachment of the line, and with only one hand if desired; to provide such a hook adapted for ready manufacture at low cost, as from stock bar or wire material, as for instance a heavy malleable steel wire, or the hook may be cast with any desired form of mounting base.

My invention is illustrated by the accompanying drawing in which:

Figure 1 is a side view of the hook in its usually normal position with its principal axis extending horizontally.

Fig. 2 is a top view of the hook, as viewed in Fig. 1.

Fig. 3 is an end view, as from the left of Fig. 1, with a line or cord in place.

Fig. 4 is a perspective view of the hook with a clothesline or the like secured thereto.

Fig. 5 is a reduced scale view with the hook screwed to a post.

More in detail, the hook 1 for clothesline size is made by taking a straight bar of appropriate material and gauge, about eight inches long, and forming threads on one end as at 2 for screwing into a wooden post 4 or the like. The other end is then bent as at 5 to a U-shape with the threaded arm or shank 6 considerably longer than the other arm. The then resultant U-end or part of the device is next bent crosswise of its principal plane as at bends 7 and 7' to a secondary U-shape or twin-U design so that the original bend 5 will come back toward the threaded tip 2 and nearly to the tip of the ultimate short arm 9 but somewhat short thereof. All bends or U-parts 5, 7 and 7' are rather abrupt but are adapted to admit therein the cord or line 15 to be anchored, as will be explained.

The preferred method of attaching an end of the line 15 is to lay the corresponding tip part 16 in either direction within and across the twin-U part or cradle 18 and then swing the adjacent body part 19 of the line crosswise and diagonally upward around the single loop 5 and thence downward at part 20 between the threaded shank 6 and the parallel tip part 9 of the hook.

I have thus produced in effect a hook 1 comprising a mounting-shank 6 of any desired form, a turned-back part 5 with a corresponding cradle or pocket part 18 adapted to receive the tip 16 of a line 15 laid in and across said pocket part 18, and a shank-paralleling part 9 to receive a body part 20 of the line in bearing relation to the said line tip 16 and with an intermediate part 19 of the line, next to said tip looped around said turned back part 5 of the hook.

It will be noted that the harder the line 15 is pulled by its load the tighter the end part 16 is bound against and so secured to the bends or U-parts 7 and 7'. It is preferred that the line should fit rather snugly at 20 between parts 6 and 9 so that when the load is removed and tension released the fastening will tend to remain set, though easily releasable by pulling or pushing the hook-adjacent part of the line, next to part 20 of the line in bearing relation to the said in Figs. 4 and 5. Or the loop part 19 may be swung and pushed to the right, in these views, to facilitate release.

I conceive my invention as residing mainly and essentially in the triple loop structure and the co-effective arrangement of parts of the three loop elements taken as a unitary and cooperative whole, as herein set forth.

It is to be understood that some of the details set forth may be altered or omitted without departing from the spirit of my invention as defined by the following claims.

I claim:

1. A line anchoring hook consisting of a metal bar in the condition of having been bent to U-shape and then further bent by turning the loop toward the bar ends.

2. A line anchoring hook formed from a straight metal bar by threading one end of the bar, then bending the opposite end U-wise and then turning the loop end of the resultant U-part back toward the threaded end.

3. As an article of manufacture a hook comprising a mounting-shank part, a turned-back part with a corresponding pocket part adapted to receive the tip of a line laid in and across said pocket part and a shank-paralleling part to receive a body part of the line in bearing relation to said tip and with an intermediate part of the line looped around said turned-back part.

4. A hook of the class described comprising a pair of mainly similar U-members disposed side by side in mutually spaced parallel relation, an arm tip of one said member being connected crosswise to the corresponding adjacent tip of the other said member and one of the free tipped arms being protrudent beyond the other and adapted for support of the hook as a whole.

5. A hook of the class described comprising substantially a pair of mainly similar U-members disposed side by side in mutually spaced parallel relation, means connecting an arm tip of one of said members crosswise to the corresponding adjacent tip of the other of said members and one of the other arms, opposite said means, being protrudent and adapted for support of the hook as a whole.

6. A bent-wire hook of the class described comprising a pair of mainly similar U-parts disposed side by side in mutually spaced parallel relation, an arm tip of one said U-part being extended crosswise to the corresponding adjacent tip of the other said U-part and one of the several U-arms being protrudent and adapted for support of the hook as a whole.

7. A rope-and-hook fastening comprising a rope and a U-hook with its arms spaced substantially the thickness of the rope and having one arm longer than the other to serve as a support and said hook having its bowed end folded back U-wise over its shank end and substantially parallel therewith.

ALFRED C. MOORK.